United States Patent
Kardach et al.

(10) Patent No.: US 7,631,199 B2
(45) Date of Patent: Dec. 8, 2009

(54) VARIOUS METHODS AND APPARATUSES FOR POWER STATES IN A CONTROLLER

(75) Inventors: James P. Kardach, Saratoga, CA (US); Barnes Cooper, Tigard, OR (US); Seh Kwa, San Jose, CA (US); Animesh Mishra, Pleasanton, CA (US); Paul Diefenbaugh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 526 days.

(21) Appl. No.: 11/173,784

(22) Filed: Jun. 30, 2005

(65) Prior Publication Data

US 2007/0005997 A1    Jan. 4, 2007

(51) Int. Cl.
*G06F 1/00* (2006.01)
*G06F 1/32* (2006.01)

(52) U.S. Cl. .................. 713/300; 713/320; 713/323; 713/324; 439/43; 439/44; 439/55

(58) Field of Classification Search .............. 713/300, 713/320, 323, 324; 439/43, 44, 55
See application file for complete search history.

(56) References Cited

U.S. PATENT DOCUMENTS

| | | | | |
|---|---|---|---|---|
| 4,922,448 A | * | 5/1990 | Kunieda et al. | 713/320 |
| 6,058,485 A | * | 5/2000 | Koziuk et al. | 713/320 |
| 6,460,143 B1 | * | 10/2002 | Howard et al. | 713/323 |
| 6,708,278 B2 | * | 3/2004 | Howard et al. | 713/323 |
| 6,727,952 B1 | * | 4/2004 | Hirata et al. | 348/372 |
| 6,820,169 B2 | | 11/2004 | Wilcox et al. | |
| 7,003,639 B2 | | 2/2006 | Tsern et al. | |

OTHER PUBLICATIONS

U.S. Appl. No. 11/174,060, "Office Action Mailed Oct. 4, 2007".

* cited by examiner

*Primary Examiner*—Thomas Lee
*Assistant Examiner*—Michael J Brown
(74) *Attorney, Agent, or Firm*—Blakely, Sokoloff, Taylor & Zafman LLP

(57) ABSTRACT

Various methods, apparatuses, and systems are described in which a chipset controller has circuitry to control communications with a peripheral device in a computing device. The chipset controller has logic configured 1) to detect a plug-in event when the peripheral device connects to the chipset controller and 2) to transition the chipset controller from a low power consumption state to a higher power consumption state based on the logic detecting the plug-in event.

12 Claims, 4 Drawing Sheets

VARIOUS METHODS AND APPARATUSES FOR POWER STATES IN A CONTROLLER

FIELD

Aspects of embodiments of the invention relate to the field of power management; and more specifically, to the power management of chipset controllers.

BACKGROUND

Some system devices such as memory may operate in various power consumption modes such as active, standby, and off. These power consumption modes of these devices coincide with and are globally controlled by the power consumption mode of the overall system. If the entire system is off, then all of the components of the system such as disk drives, processors, are powered off. If the entire system is in a standby mode, then most of the components in the system are in a reduced consumption mode. If the entire system is in an active mode, then all of the components in the system are in a fully powered up state.

In some systems, all controllers going to devices, such as the memory and Universal Serial Bus (USB) ports, are enabled and powered even if nothing is attached to these controllers. As such, the controllers consume power through 1) leakage, 2) their internal switching circuitry ($CV^2F$), and 3) the physical layer drivers. The controllers typically remain powered because they support some sort of plug in event and the controllers need to understand when a device may be plugged into the controller. As such, these controllers are seldomly powered off in the system and tend to lend themselves to a steady power addition to the overall power consumption of the device.

BRIEF DESCRIPTION OF THE DRAWINGS

The drawings refer to embodiments of the invention in which.

Figure 1:
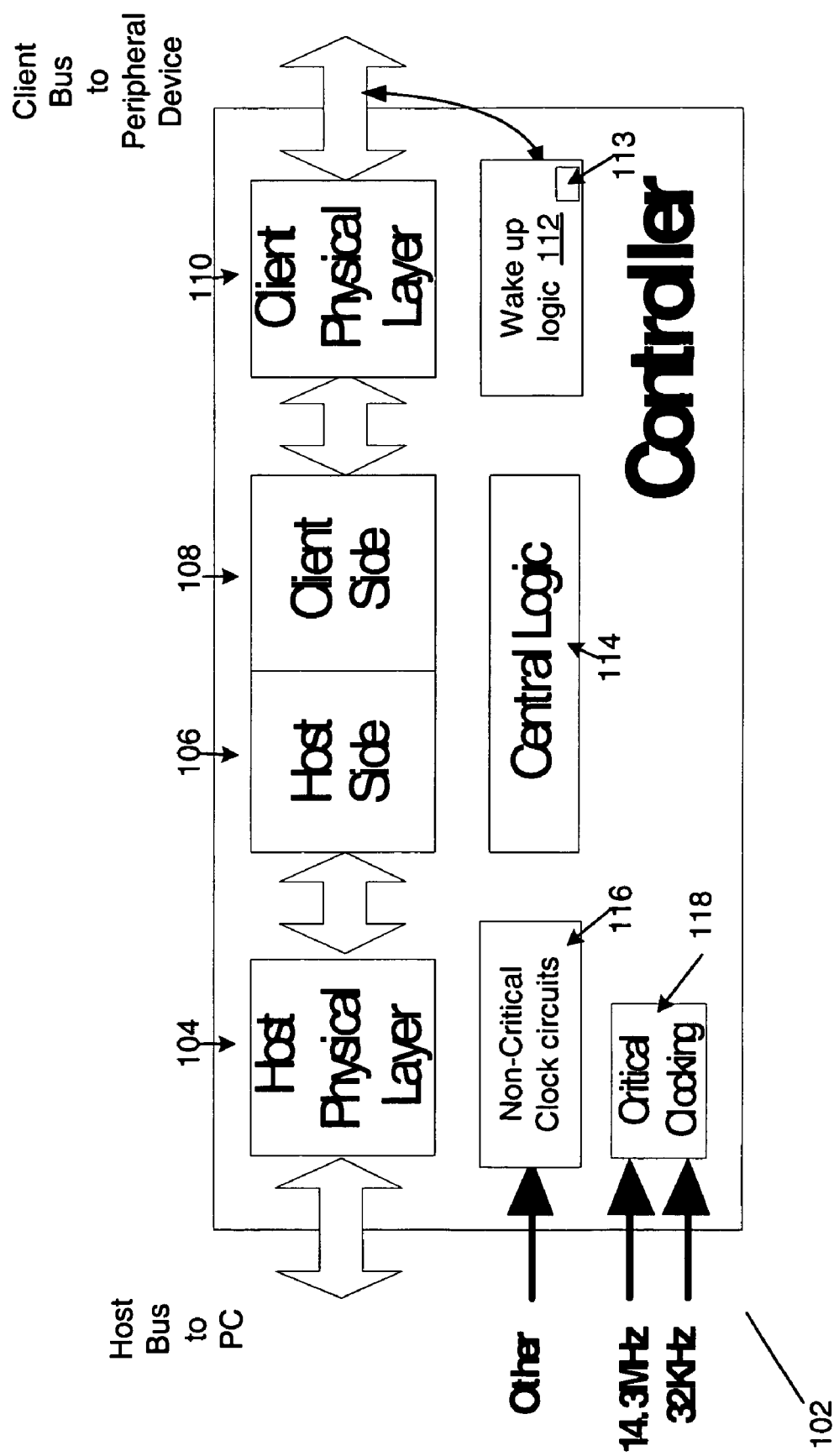
FIG. 1 illustrates a block diagram of an embodiment of a chip-set controller.

While the invention is subject to various modifications and alternative forms, specific embodiments thereof have been shown by way of example in the drawings and will herein be described in detail. The embodiments of the invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, types of clocking circuits, etc., in order to provide a thorough understanding of the embodiments of the invention. It will be apparent, however, to one of ordinary skill in the art that the embodiments of the invention may be practiced without these specific details. Thus, the specific details set forth are merely exemplary. The specific details may be varied from and still be contemplated to be within the spirit and scope of the present invention.

In general, various methods, apparatuses, and systems are described in which a chipset controller has circuitry to control communications with a peripheral device in a computing device. The chipset controller has logic configured 1) to detect a plug-in event when the peripheral device connects to the chipset controller and 2) to transition the chipset controller from a low power consumption state to a higher power consumption state based on the logic detecting the plug-in event. Each chipset controller may enter the low power consumption state on an individual/local basis while the remainder of the computing device may be operating in a fully powered consumption state.

FIG. 1 illustrates a block diagram of an embodiment of a chip-set controller. The chip-set controller 102 may have various circuits, such as a host physical layer 104, a host side gates 106, a client side gates 108, a client side physical layer 110, wake-up logic 112, central logic 114, non-critical clocking circuits 116, critical clocking circuits 118, and other similar circuitry. The electronic circuitry of the chipset controller may perform timing and signaling conversions between a peripheral device and the host computing device. Accordingly, the chip-set controller 102 has circuitry to control communications with a peripheral device in a computing device.

One or more chipset controllers may be contained on a die within an integrated package. Each chipset controller, such as a Universal Serial Bus (USB) controller, Serial Advance Technology Attachment (SATA) controller, Peripheral Component Interconnect (PCI) controller and similar controllers, may interface with a peripheral device with the computing device's resources. A peripheral device may be a hardware device connected to the computing device that is external to the integrated package containing the chipset controllers in the computing device, such as a monitor, a keyboard, a printer, a USB disk drive, a Bluetooth circuit, and similar devices. The chipset controller 102 has both a host side that connects to a computer's resources and a client side that connects to the peripheral device.

The peripheral device typically connects via a bus to the client side-physical layer 110. The client side bus may also be monitored by the wake-up logic 112. The wake-up logic 112 may have circuitry configured to detect a plug-in event when the peripheral device connects to the chip-set controller 102. The wake-up logic 112 has circuitry to place this chip-set controller 102 in a reduced power state on an individual/local basis while the remainder of the components in the computing system are in a fully powered active power state.

The client side gates 108 may convert timing discrepancies computing device and the peripheral device to interface the devices. The client side gates 108 may also perform data signal conversion between the between the data sent by the peripheral device to the computer. Similarly, the host side gates 106 may perform timing conversions and data signal conversions between the peripheral device to the computer.

The central logic 114 may contain configuration registers to be programmed by a driver to configure the chipset controller 102 and the peripheral device. The client side and host side physical layers 104, 110 may contain the input/output buffers, the power circuits to power the peripheral device, and other such circuits. Thus, the client side physical layer 110 may contain the buffers that drive and sample the bus signals on the bus that connects the chipset controller 102 to the peripheral device.

The non-critical clock circuits 116 may be clock circuits that can be powered down during a reduced power consumption mode. The critical clocking circuits 118 remain powered and continue to function, even when the chipset controller is in a local reduced power consumption mode. The critical clocking circuits 118 represent clocks within the platform which are never turned off in a reduced power consumption state except when the entire computing device is powered off. In an embodiment, the critical clocking circuits 118 may include, for example, the 14 mega-hertz color burst crystal source, and the 32 kilo-hertz Real Time Clock (RTC) clock.

The chip-set controller 102 may have two or more states of power consumption such as On, Off and Stand-by, which are controlled by the wake-up logic 112. The wake-up logic 112 causes the circuitry in the chip-set controller 102 to power-up and reset the controller's logic upon detection of the plug-in event. The wake-up logic 112 allows the chip-set controller 102 to operate in a low power consumption state such as stand-by while the computing device operates in a second power consumption state, such as an active working power state. The chip-set controller 102 operates in this low power consumption state until the wake-up logic 112 detects a plug-in event. Thus, each chipset controller may on a local basis enter into a reduced power state while the overall computing system is operating at a fully powered state. The low power consumption state may be, for example, once out of every ten Operating System (OS) preempt intervals the chipset controller will be refreshed to determine whether a peripheral device has connected to that controller or not. The refreshing causes the chipset controller 102 to detect for a plug-in event associated with the peripheral device connecting to the chipset controller 102. The circuitry in the wake-up logic 112 is configured to cause the chip-set to transition from a first power consumption state, such as an "off" power state to a second higher power state, such as a "fully active" powered consumption state, in response to the detection of the plug-in event.

The wake up logic 112 has circuitry to implement a detection mechanism 113, such as an in-band detection mechanism, to detect a change in a signaling parameter, such as impedance, voltage, etc, of the input signals from the peripheral device to detect the plug-in event. An in-band detection mechanism may use input signaling characteristics on the existing bus between the chipset controller 102 and the peripheral device to detect for the plug-in event.

Alternatively, the wake up logic 112 has circuitry to implement a detection mechanism 113, such as a side-band detection mechanism, to detect a grounding of a general purpose input pin caused by a plug connector or card. The sideband detection mechanism requires one or more pins, which sole purpose is to detect whether a device is connected to a client port of the chipset controller 102.

The wake up logic 112 has circuitry to transition the chipset controller 102 from a higher power consumption state to a lower power consumption state in response to detection of the peripheral device disconnecting from the computing device The central logic 114 has circuitry to receive configuration data from a driver program to control entering a reduced power consumption state for the chipset controller 102 and arming the logic to detect the plug-in event. The driver program may configure the configuration registers in the central logic 114 of the chipset controller 102. The driver program may enumerate, i.e., detects, identifies, and configures, a peripheral device connecting to the chipset controller 102.

In the lower power consumption states, the critical clocking circuits 118 of the chip-set controller 102 are not turned off when the chip-set controller 102 enters a local reduced power consumption state. Further, the wake-up logic 112 is not turned off when the chip-set controller 102 enters a reduced power consumption state on a local basis. Thus, the wake-up logic 112 utilizes critical clocking circuits 118 such that non-critical clocking circuits 116 can be shut off to achieve additional power savings. For the most part, the remainder of client side and host side physical layers 104, 110, client side and host side gates 106, 108, and the non-critical clock circuits 116 are turned off during the reduced power consumption states. However, for some peripheral devices, portions of the chipset controller 102 may remain powered, such as the client side physical layer 110 and the client side gate 108. For these peripheral devices, the client side of the chipset controller 102 needs to maintain at least some signaling, such as frames, between the peripheral device and the chipset controller 102. Nonetheless, the host side circuitry 104, 106 may be maintained fully powering down.

The central logic 114 may have circuitry to detect a power mode signal originated from a power management application to control the power consumption mode of the components in the computing device on a global basis. The power management application may control global system power states such as Mechanical Off, Soft Off, Sleeping, Working, and Non-Volatile memory Sleep, to all of the components in the computing device. In an embodiment, the device driver program and wake-up logic 112 for each chipset controller 102 may control local device power states such as Off (D3), D2, D1, and Fully-On (D0). The circuitry in the central logic 114 may detect a signal from the device driver program to control a power consumption mode of the chipset controller 102 on a local basis. Alternatively, the device driver may program a configuration register in the central logic 114.

Each power state defines which circuit portions of the chipset controller 102 will be powered off when entering that power state. Each power state can also define whether the chipset controller 102 causes the connected peripheral device to also enter a reduced power consumption state.

As discussed above, a responsibility of the wake-up logic 112 is to detect a wake-up event. If using an in-band detection mechanism (e.g. PCI express tries to detect a change in impedance of the signals) then the wake-up logic 112 may turn on the client side physical layer 110 at a regular interval (e.g. 500 ms or so) for a short period of time to minimize power. If the wake-up logic 112 detects a peripheral device is plugged in and operating in a non-reduced power consumption state, then the wake-up logic 112 re-powers and resets the entire chipset controller 102. The wake-up logic 112, then un-isolates the chipset controller 102 from the host bus, otherwise the wake-up logic 112 keeps the chipset controller 102 powered off and waits for the next detection interval. If the wake-up logic 112 uses a side-band detection mechanism (e.g. General Purpose Input, GPI, pin waiting to be grounded by a plug or card), then the wake-up logic 112 just waits for the plug in event. In an embodiment, the wake-up logic 112 re-powers combinational logic such that the controller maintains state. In this case, all of the flip-flops and combinational gates may be isolated. When the entire chipset controller 102 is turned back on then the controller's state is maintained.

Conversely, if a peripheral device is removed, then the wake-up logic 112 can detect this un-connected condition and initiate the re-entering of the reduced power consumption state in order to conserve power until another device plug-in event is detected. In this fashion, the chipset controllers can be deeply power managed without active OS-level software management interaction.

Figure 2:
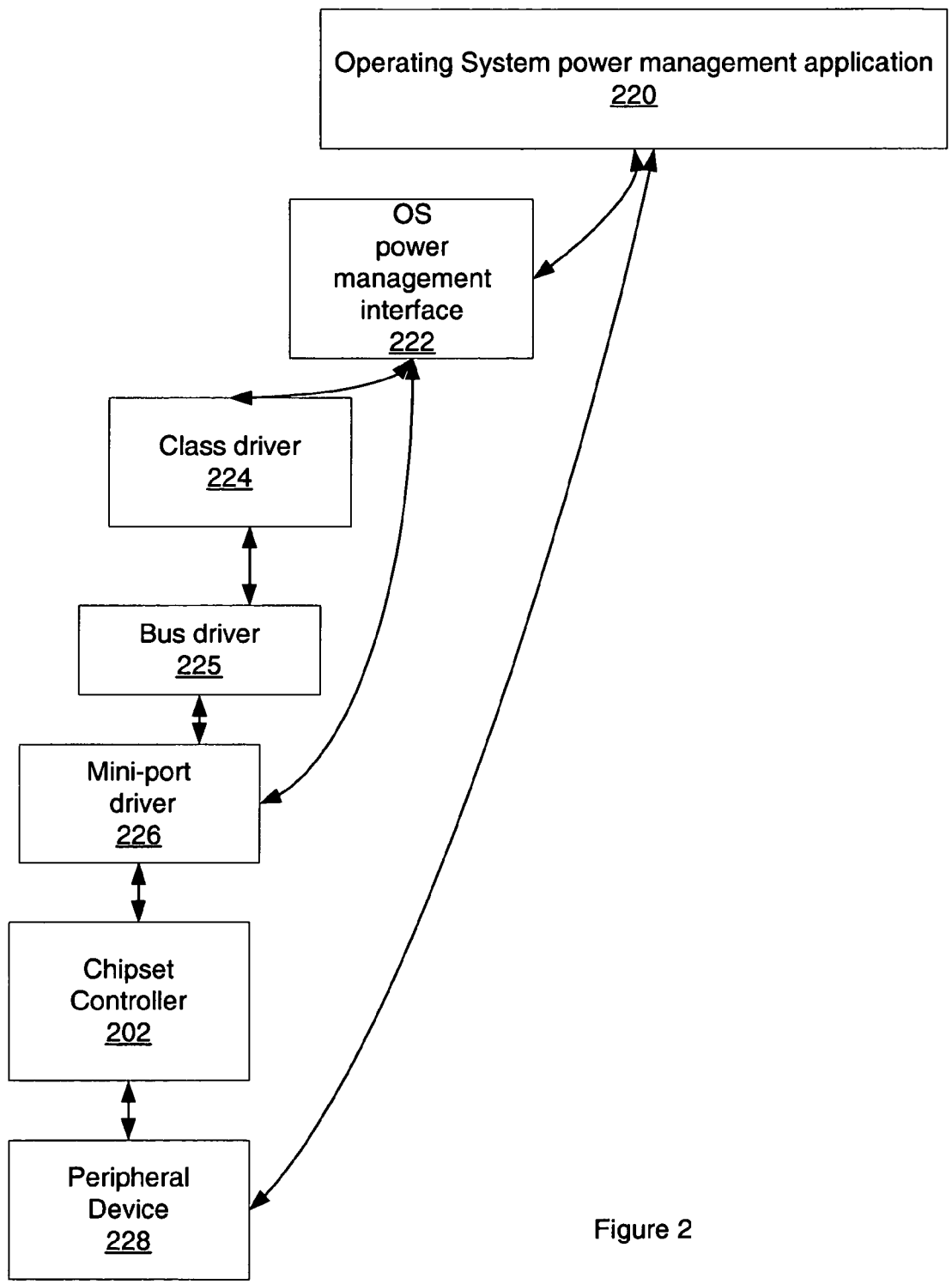
FIG. 2 illustrates a block diagram of an embodiment of an Operating System (OS) power management interface interacting with drivers and the chipset controller.

FIG. 2 illustrates a block diagram of an embodiment of an Operating System (OS) power management interface interacting with drivers and the chipset controller. The OS power management application 220 may control system power consumption states for the components in the computing system on a global basis. An OS power management interface 222, such as an Advanced Configuration and Power Interface (ACPI) interface, may communicate with a class driver program 224 and a mini-port driver program 226. The class driver program 224 may receive multiple signals from multiple software programs. The mini-port driver program 226 is specific to a given controller. The mini-port driver program 226, as discussed before, may turn the chipset controller 202 on and off by setting its state in the driver. The chipset controller 202 may have wake up logic to place the chipset controller 202 into a reduced power consumption state when the OS places the peripheral device 228 attached to the chipset controller 202 into a reduced power consumption state. In an embodiment, the reduced power consumption states may be defined by the Advanced Configuration and Power Interface (ACPI) Specification, Revision 2.0a dated Mar. 31, 2002 (and published by Compaq Computer Corporation, Intel Corporation, Microsoft Corporation, Phoenix Technologies Ltd., and Toshiba Corporation). The chipset controller 202 may then have its powered on state controlled by the driver and the configuration registers in the central logic. The peripheral device 228 may be implemented with a plug and play configuration.

The miniport driver 226 controls the configuration settings of the chipset controller 202. The chipset controller 202 may control communications with the peripheral device 228. The class driver 224 may control the device power states to the peripheral device 228 while the OS power management interface 222 may control the device power states when system power states change within the system (e.g. Notifies all drivers that the system is about to suspend, or the system has resumed). Devices that do not comply with a power management standard may use control methods which are executed by the OS power management interface 222 to control Field Effect Transistors (FETs) in order to turn power on or off to a peripheral device 228. The bus driver 225 is responsible for providing services for the bus controller such as discovering devices plugged into the bus, and enumerating that device into the system. The bus driver 225 may find the peripheral device's 228 class driver 224 and attach it to the bus driver 225. The miniport driver 226 is responsible for translating the bus driver 225 messaging to the specific hardware of the chipset controller 202. The class driver 224 determines how often the peripheral device 228 enters a low power state. When the class driver 224 puts the peripheral device 228 in a low power state, then the mini-port driver 226 can put the chipset controller into a low power state. Additionally, if there is no device connected to the chipset controller 202, then the mini-port driver 226 can put the chipset controller 202 into a low power state.

The power management application 220 sets policies for how the platform is power managed. These policies include when to suspend or hibernate the system, and how aggressive the system should be when power managing devices when the system is idle.

The wake up logic allows the chipset controller 202 to enter a first reduced power consumption state on an individual/local basis when the power management application 220 directs the computing device to operate in a fully active power state on a global basis. In an embodiment, notebook computer chipsets can power-off all chipset controllers until they are actually needed by adding such wake up logic to the platform. Powering-off all chipset controllers until they are actually needed aids in reducing the overall power consumption of an unloaded computing system. Additionally, these benefits may come at no loss of functionality as the overall function remains the same in that a plug event is detected, the device is eventually found, and enumerated for the user with little perceptible delay.

In an embodiment, the wake up logic can be used to provide a D3 reduced power consumption state for on-chip controllers that have peripheral devices attached to them that are placed into a D3 state. A D3 reduced power state essentially being a chipset controller being powered off except for the critical clocking circuits and the wake logic. In operation, upon boot-up the BIOS will place the un-connected controller into a super-D3 state that would be controlled by a register bit accessible by the BIOS. Depending on the type of controller and configuration of the platform, the wake-up logic may have the ability to turn on/off the client physical layer in order to detect an in-band wake event, or in a side-band wake event case, connects to an input pin that indicates when something is plugged into the connector for which the controller is connected.

Figure 3:
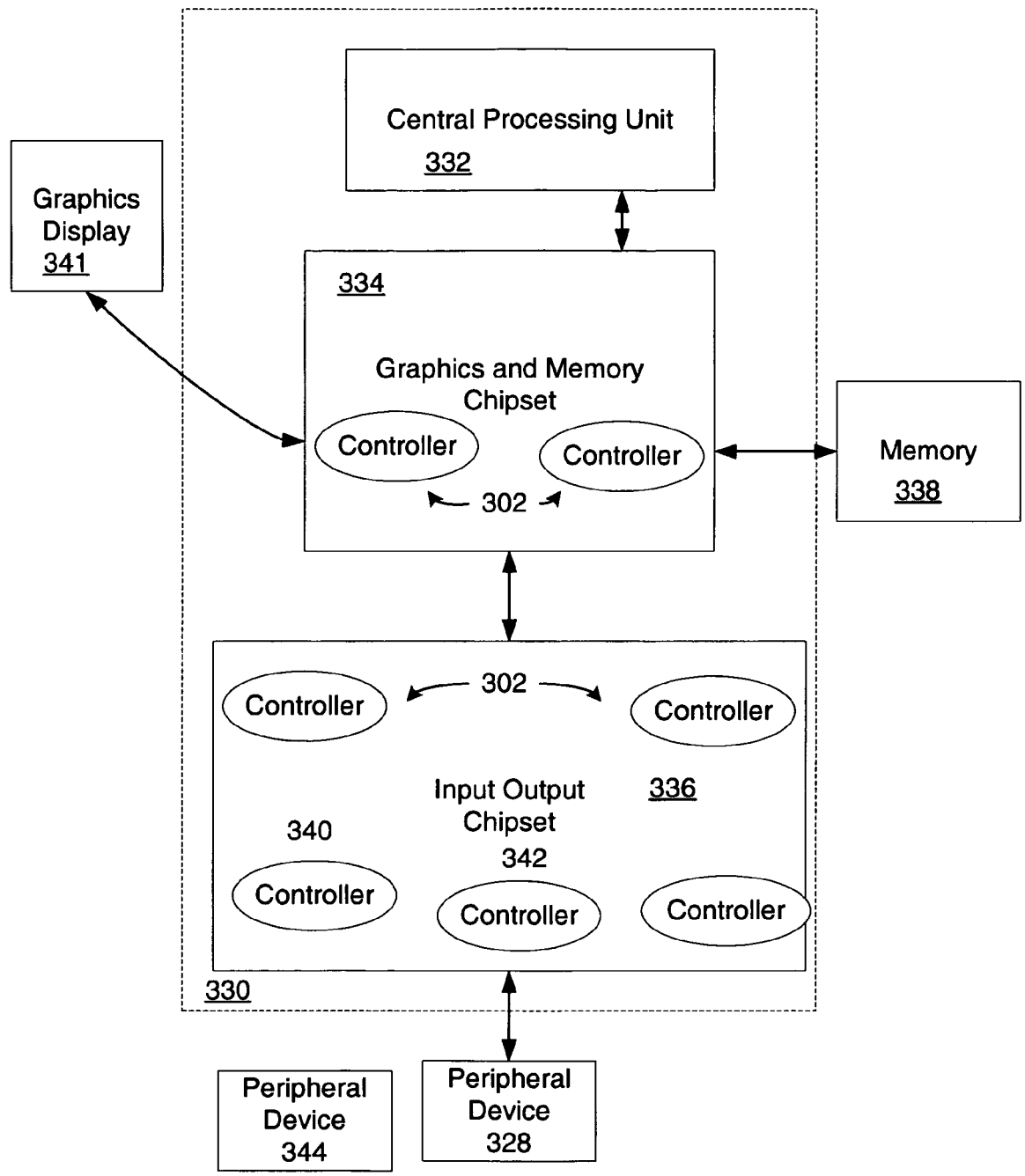
FIG. 3 illustrates block diagram of an embodiment of a die containing a central processing unit, two controllers, such as a graphics memory control hub and an input/output control hub.

FIG. 3 illustrates block diagram of an embodiment of a die containing a central processing unit, two controllers, such as a graphics memory control hub and an input/output control hub. The example die 330 may contain a central processing unit 332, a graphics and memory control chipset 334, and an input-output chipset 336. The central processing unit 332 connects to the graphics and memory control chipset 334, which connects to the input-output chipset 336. The graphics and memory control chipset 334 may connect to one or more memory devices 338 and one or more display devices 341. The graphics and memory control chipset 334 may have one or more chipset controllers 302. The input-output chipset 336 may have one or more chipset controllers 302. Each of the input-output chipset controllers 302 typically connects to a peripheral device, external to the integrated package containing the die 330, which contains these controllers 302, chip sets 334, 336, and central processing unit 332. Each input-output controller 302 may have wake-up logic, which controls the power consumption state of that input-output device based upon detecting or not detecting a plugged in peripheral device to that chip set controller. In one embodiment, the wake-up logic may include various FETs. The FETs may turn off whole portions of the circuitry in the controller such as the host side gates, the host side physical layer, the critical clocking circuits, etc.

In operation, a first chipset controller 340 may operate in the first reduced power consumption state based on a first peripheral device 344 being un-connected to the first chipset controller 340. A second chipset controller may operate in the non-reduced power consumption state based on a second peripheral device 328 being in the non-reduced power consumption state and being connected to the second chipset controller 342.

The die 300 may be contained in the computing device. The computing device may be for example a lap top computer, a personal digital assistant, a cellular phone, or other device powered by a battery.

Figure 4:
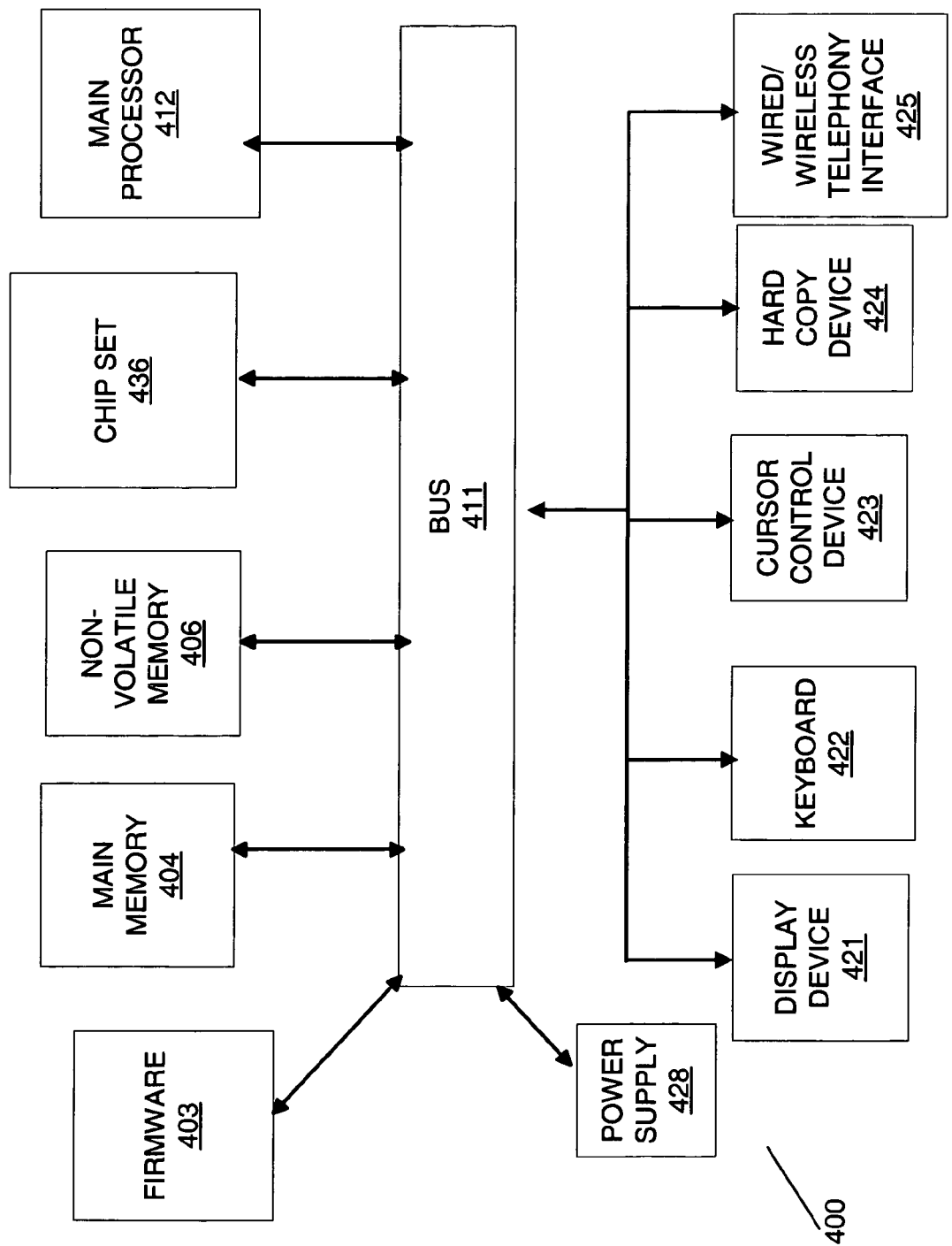
FIG. 4 illustrates a block diagram of an example computer system that may use an embodiment of a chipset controller having logic 1) to detect a plug-in event when the peripheral device connects to the chipset controller and 2) to transition the chipset controller from a low power consumption state to a higher power consumption state based on the logic detecting the plug-in event.

FIG. 4 illustrates a block diagram of an example computer system that may use an embodiment of a chipset controller having logic 1) to detect a plug-in event when the peripheral device connects to the chipset controller and to transition the chipset controller from a low power consumption state to a higher power consumption state based on the logic detecting the plug-in event. In one embodiment, computer system 400 comprises a communication mechanism or bus 411 for communicating information, and an integrated circuit component such as a main processing unit 412 coupled with bus 411 for processing information. One or more of the components or devices in the computer system 400 such as the chip set 436 may use an embodiment of the chipset controller having wake up logic. The main processing unit 412 may consist of one or more processor cores working together as a unit.

Computer system 400 further comprises a Random Access Memory (RAM) or other dynamic storage device 404 (referred to as main memory) coupled to bus 411 for storing information and instructions to be executed by main processing unit 412. Main memory 404 also may be used for storing temporary variables or other intermediate information during execution of instructions by main processing unit 412.

Firmware 403 may be a combination of software and hardware, such as Electronically Programmable Read-Only Memory (EPROM) that has the operations for the routine recorded on the EPROM. The firmware 403 may embed foundation code, basic input/output system code (BIOS), or other similar code. The firmware 403 may make it possible for the computer system 400 to boot itself.

Computer system 400 also comprises a read-only memory (ROM) and/or other static storage device 406 coupled to bus 411 for storing static information and instructions for main processing unit 412. The static storage device 406 may store OS level and application level software.

Computer system 400 may further be coupled to a display device 421, such as a cathode ray tube (CRT) or liquid crystal display (LCD), coupled to bus 411 for displaying information to a computer user. A chipset may interface with the display device 421.

An alphanumeric input device (keyboard) 422, including alphanumeric and other keys, may also be coupled to bus 411 for communicating information and command selections to main processing unit 412. An additional user input device is cursor control device 423, such as a mouse, trackball, trackpad, stylus, or cursor direction keys, coupled to bus 411 for communicating direction information and command selections to main processing unit 412, and for controlling cursor movement on a display device 421. A chipset may interface with the input output devices.

Another device that may be coupled to bus 411 is a hard copy device 424, which may be used for printing instructions, data, or other information on a medium such as paper, film, or similar types of media. Furthermore, a sound recording and playback device, such as a speaker and/or microphone (not shown) may optionally be coupled to bus 411 for audio interfacing with computer system 400. Another device that may be coupled to bus 411 is a wired/wireless communication capability 425.

In one embodiment, the software used to facilitate the driver programs, power management programs, and the logic described above can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

The wake-up logic allows un-attached controllers to draw almost no power and provide the same functionality users expect (something plugs in, and it works). Allowing the physical layers of the controllers to be powered off when not used saves power, and further for external clocking to be powered off if all the controllers of a certain time are off and a non-critical clock source is not needed. Eliminating leakage from the chipset controller to the peripheral device also saves power.

This allows mobile chipsets to achieve a lower active and idle power by allowing unattached controllers to be substantially powered off (logic, phys and clocking). The wake up logic allows each controller to enter a local reduced power mode independent of the OS actively managing this reduced power mode.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. For example, the wake up logic and controlling power modes on an individual basis may be implemented in a wide variety of chipset controllers as previously described. The logic described above may be implemented with hardware Boolean logic, software, firmware, any combination of the three and similar implementation techniques. Power may be turned off across multiple controllers of the same type with a single signal where at least two or more types of controller types exist in this system. A controller and attached peripheral may have a 1-to-1 relationship or a single controller may service two or more attached devices. In an area of technology such as this, where growth is fast and further advancements are not easily foreseen, the disclosed embodiments may be readily modifiable in arrangement and detail as facilitated by enabling technological advancements without departing from the principals of the present disclosure or the scope of the accompanying claims.

We claim:

1. An apparatus, comprising:
    a chipset controller having:
        circuitry to control communications with a peripheral device in a computing device;
        logic to detect a plug-in event when the peripheral device connects to the chipset controller and to transition the chipset controller from a first power consumption state to a second power consumption state based on the logic detecting the plug-in event or when directed by an operating system, and having circuitry to place the chipset controller into the first power consumption state when a power management application places the peripheral device attached to the chipset controller into the first power consumption state, where the first power consumption state is a lower power consumption state than the second power consumption state; and
        central logic having circuitry to receive configuration data from a driver program to control the chipset controller entering a reduced power consumption state.

2. The apparatus of claim 1, wherein the logic has circuitry to allow the chipset controller to operate in the first power consumption state, while an operating system directs the computing device to operate in the second power consumption state, until the logic transitions the chipset controller from the first power consumption state to a second power consumption state in response to the detection of the plug in event.

3. The apparatus of claim 1, wherein the chipset controller further comprises: arming the logic to detect the plug-in event.

4. The apparatus of claim 1, wherein the logic has circuitry to implement an in-band detection mechanism to detect a change in a first signaling parameter of an input signal from the peripheral device to detect the plug-in event.

5. The apparatus of claim 1, wherein the logic has circuitry to implement a side-band detection mechanism to detect a grounding of an input pin to detect the plug-in event.

6. The apparatus of claim 1, wherein the logic has circuitry to transition the chipset controller from the second power consumption state to the first power consumption state in response to detection of the peripheral device disconnecting from the computing device.

7. The apparatus of claim 1, wherein the chipset controller further comprises: central logic having circuitry to detect a power mode signal originated from a power management application to control the power consumption mode of the components in the computing device on a global basis, wherein the circuitry to detect a second signal from a device driver program to configure a power consumption mode of the chipset controller on a local basis.

8. The apparatus of claim 1, wherein the computing device has a battery power supply.

9. A system, comprising:
   a chipset that includes one or more chipset controllers, wherein a first chipset controller having circuitry to control communications with a peripheral device in a computing device, wherein the first chipset controller has logic to detect a plug-in event when the peripheral device connects to the first chipset controller and to transition the first chipset controller from a first power consumption state to a second power consumption state based on the logic detecting the plug-in event or when directed by an operating system, and having circuitry to place the chipset controller into the first power consumption state when a power management application places the peripheral device attached to the chipset controller into the first power consumption state, where the first power consumption state is a lower power consumption state than the second power consumption state and central logic having circuitry to receive configuration data from a driver program to control the chipset controller entering a reduced power consumption state.

10. The system of claim 9, further comprising: a first logic in the first chip set controller to place the first chip set controller in the first power consumption state in response to a first signal generated from an operating system power management interface; and a second logic in a second chip set controller to place the second chip set controller in the second power consumption state in response to a second signal generated from the operating system power management interface.

11. The system of claim 9, wherein the logic has circuitry to cause the chipset controller to enter the first power consumption state on a local basis when a power management application directs the computing device to operate in the second power consumption state on a global basis.

12. The system of claim 9, wherein the chipset controller has a critical clocking circuit that remains powered when the chip set controller enters the first power consumption state.

* * * * *